April 23, 1957 J. KREMSER 2,789,512
GEAR PUMP, PARTICULARLY FOR OBTAINING A HIGH-PRESSURE FEED
Filed Oct. 6, 1953

INVENTOR
JOHANN KREMSER
BY
ATTORNEY.

2,789,512

GEAR PUMP, PARTICULARLY FOR OBTAINING A HIGH-PRESSURE FEED

Johann Kremser, Hannover, Germany

Application October 6, 1953, Serial No. 384,419

Claims priority, application Germany November 18, 1952

8 Claims. (Cl. 103—126)

The present invention relates to a gear-type pump, which is particularly suited for producing a high-pressure feed. Gear-type pumps are already known in which two gears are in mesh with each other, said gears being enclosed in a tightly fitting housing, whereby on one side of the point of contact of the gear teeth the oil supply line, and on the other side the oil discharge line are arranged. The gear teeth must glide very close to the housing walls to produce the oil pressure feed.

It has been found that in high-pressure pumps the gears may be displaced from their exact center position between the housing walls, and that they are pushed against the one or the other wall, thus causing damage to the pump.

It is one object of the present invention to eliminate the deficiencies of the pumps known so far in that the axial guide of the gears is secured by means of slide bearings which are provided with wedge-shaped cavities. Said lubricating cavities are designed so that the hydraulic pressure produced keeps the gears in a position between the lateral walls of the housing, thus preventing the gears from being pushed against them.

It is another object of the present invention to provide lubricating cavities in the lateral housing members. On the other hand, however, it is also possible to arrange the lubricating cavities in the lateral faces of the gears. If bushings are used to journal the gears, the wedge-shaped lubricating cavities may be provided on the face of said bushings.

It is yet another object of the present invention to provide lubricating cavities the radial extent of which is within the shoulder circle diameter of the gears, so that a sealing rim remains between the lubricating cavities and the teeth. The lubricating cavities may be produced by stamping, milling, grinding, or like operations. It is of particular advantage to have a cavity width of 0.002 mm. between the face of the gear and the housing wall, and to calculate the cavity width at the narrowest point in proportion to the cavity width at the widest point 1:25.

With these and other objects in view which will become apparent in the following detailed description, the present invention will be clearly understood in connection with the accompanying drawings, in which.

Figure 1:
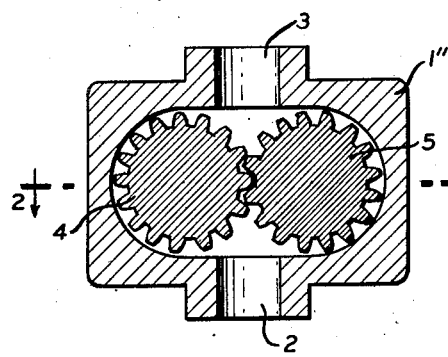
Fig. 1 is a sectional view through a gear-type pump.
Figure 2:
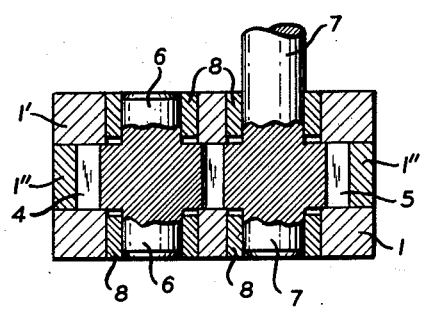
Fig. 2 is a sectional view taken on a line 2—2 of Fig. 1.

Referring now to the drawings, in the housing, formed by the members 1, 1', and 1", which at its bottom side is provided with the oil inlet 2 and on its upper side with the oil outlet 3, the gears 4 and 5, which are in mesh with each other, are arranged. The shafts 6 and 7 of the gears 4 and 5 are journalled in the housing 1 by employing bearing bushings 8. The faces of the gears glide close to the inner walls of the housing members 1 and 1', the cavity between the gear face and the corresponding housing wall being about 0.002 mm. wide.

Figure 4:
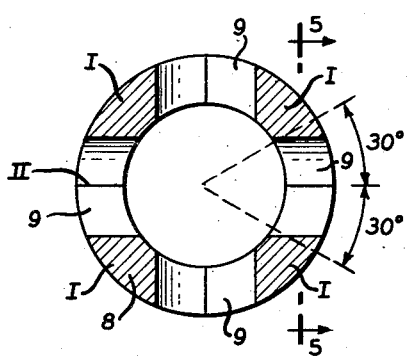
Fig. 4 is an enlarged top view on the face of the bearing bushings.
Figure 5:
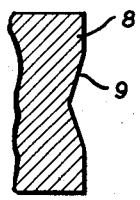
Fig. 5 is a section taken along the lines 5—5 of Fig. 4.

In order to prevent the gears from being pushed against one of the walls 1 or 1' the faces of the bearing bushings 8 are provided with lubricating cavities 9 of triangular cross section, as is shown in Figs. 4 and 5. It is to be understood, that the lubricating cavities may also be provided in the sides of the gears or in the inner walls 1 or 1' of the housing.

Figure 3:
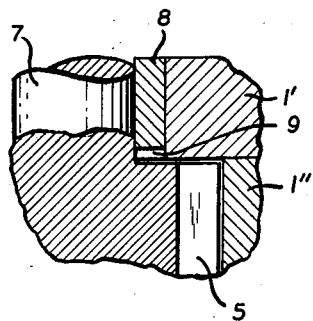
Fig. 3 is a fragmentary enlarged section of an element shown in Fig. 2.

If the bearing bushings 8 are of a smaller diameter than the shoulder circle of the gear 5, the arrangement of the lubricating cavities 9 is of particular advantage as in this case said cavities do not extend into the region of the gear teeth, and as there remains a sealing rim between the teeth and the lubricating cavities 9, as can be clearly seen from Fig. 3.

According to the lay-out of the lubricating cavities, three, four, or more of said cavities may be arranged. Production of the cavities is simplest when the bearing bushings are provided with a corresponding stamping of triangular cross section on their face. The shape of the cavities is also of great importance for the correct positioning of the gears. Preferably the width of the lubricating cavities and the ratio of the triangle is calculated so that the proportion of the cavity width at the narrowest point, i. e. in the region I (Fig. 4), to the widest point II, is 1:25. The length of the slots in each direction of the circumference may amount to about 30°.

In any case the shape of the cavities has been so calculated as to produce a perfect hydrodynamic lubrication, whereby the hydrodynamic pressures produced on both sides of the rotating gears are balanced out.

In order to continuously supply the cavities with lubricating oil, it may be of advantage to remove the sealing rim illustrated in Fig. 3, so that the cavities extend into the region of the gear teeth.

While I have disclosed several embodiments of the present invention, it is to be understood that these embodiments are given by example only and not in a limiting sense, the scope of the present invention being determined by the objects and the claims.

I claim:

1. A gear pump comprising two gears being in mesh with each other, a shaft supporting said gears, and a bushing receiving said shaft, a drive for said gears, a housing tightly enclosing said gears, an entering passage for the circulating medium into said housing opposite the point of disengagement of the teeth of said gears, a discharge passage from said housing arranged coaxially with said entering passage opposite the point of engagement of said teeth, and a plurality of lubricating grooves arranged radially in outward direction between said bushings and said gears and said grooves being of triangular cross section, the base of the triangle being in the engaging faces of said gears with said bushings and the sides of the triangle extending circumferentially from the deepest point of said grooves toward said base, the angle between the sides of the triangle being dimensioned in such manner that a hydraulic wedging effect is achieved in said grooves and said grooves being in communication with said circulating medium.

2. The gear pump, as set forth in claim 1, in which said lubricating grooves are disposed in balanced opposite arrangement so that the hydrodynamic pressure of the lubrication produced on both sides of said gears maintains said gears in a central position between the walls of said housing without one of said gears ever touching the walls.

3. The gear pump, as set forth in claim 1, in which said lubricating grooves are disposed in the side-walls of said housing which are opposite the lateral faces of said gears.

4. The gear pump, as set forth in claim 1, in which said lubricating grooves are disposed in the side-walls of said housing enclosing said gears.

5. The gear pump, as set forth in claim 1, in which the width of said grooves between the faces of said gears and the inner walls of said housing is about 0.002 mm., said lubricating grooves from the widest point extending for about 30° circumferentially, and the depth of said groove being at a ratio of 1 to 50 to the base.

6. The gear pump, as set forth in claim 1, in which said lubricating grooves extend radially to near the bottom of said teeth of said gears.

7. The gear pump, as set forth in claim 1, in which said lubricating grooves extend into the region of said teeth.

8. The gear pump, as set forth in claim 1, in which said lubricating grooves terminate short of the teeth of said gears, thereby providing a sealing rim between the teeth and the ends of said lubricating grooves.

References Cited in the file of this patent
UNITED STATES PATENTS

| | | |
|---|---|---|
| 1,344,331 | Carrey | June 22, 1920 |
| 1,379,248 | Carrey | May 24, 1921 |
| 1,451,859 | Balcker | Apr. 17, 1923 |
| 1,475,683 | Carrey | Nov. 27, 1923 |
| 2,082,412 | Morton | June 1, 1937 |
| 2,204,073 | Dodge | June 11, 1940 |
| 2,336,294 | Rea | Dec. 7, 1943 |
| 2,400,485 | Cardillo | May 21, 1946 |
| 2,468,948 | Smith | May 3, 1949 |
| 2,471,149 | Girz | May 24, 1949 |
| 2,492,073 | Taylor | Dec. 20, 1949 |
| 2,498,911 | Chittenden | Feb. 28, 1950 |
| 2,527,941 | Lauck et al. | Oct. 31, 1950 |
| 2,626,570 | Armington et al. | Jan. 27, 1953 |
| 2,676,548 | Lauck | Apr. 27, 1954 |